June 23, 1936.  J. R. OISHEI  2,045,094

MOTOR VEHICLE POWER PLANT

Filed July 20, 1932   3 Sheets-Sheet 1

Inventor
John R. Oishei
By Beau & Brooks Attorney

June 23, 1936.　　　J. R. OISHEI　　　2,045,094

MOTOR VEHICLE POWER PLANT

Filed July 20, 1932　　　3 Sheets-Sheet 2

Inventor

John R. Oishei

By Beau & Brooks

Attorneys

June 23, 1936.　　　J. R. OISHEI　　　2,045,094
MOTOR VEHICLE POWER PLANT
Filed July 20, 1932　　　3 Sheets-Sheet 3
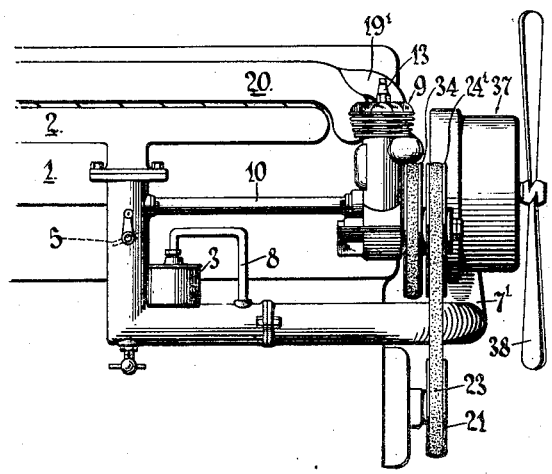
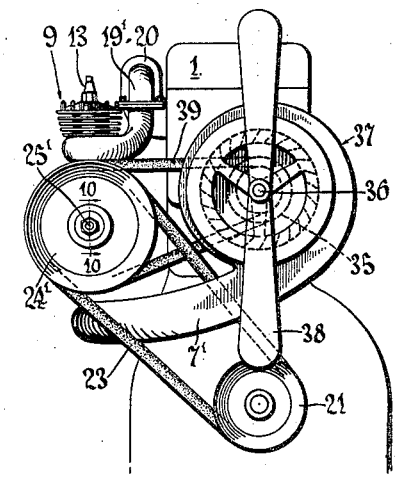
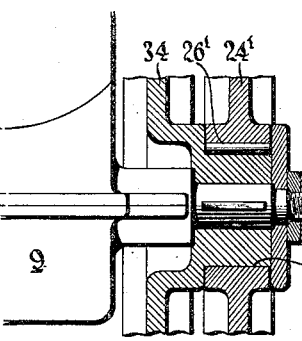
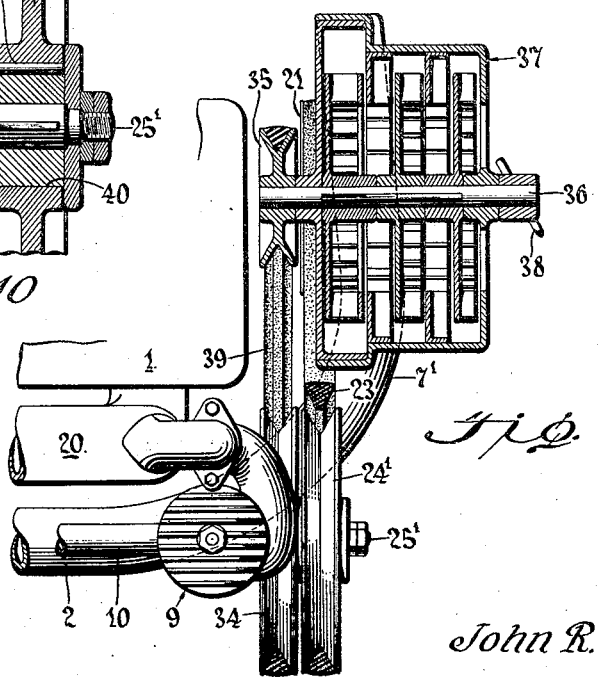
Inventor
John R. Oishei
By Beau & Brooks
Attorneys Patented June 23, 1936

2,045,094

UNITED STATES PATENT OFFICE 2,045,094

MOTOR VEHICLE POWER PLANT

John R. Oishei, Buffalo, N. Y., assignor to Trico Products Corporation, Buffalo, N. Y.

Application July 20, 1932, Serial No. 623,610

6 Claims. (Cl. 123—195)

This invention relates to a motor vehicle power plant and a method of operating the same.

The invention is primarily directed to a power plant operating on the supercharging principle by which the combustible mixture is supplied the internal combustion engine under pressure to obtain increased power therefrom.

The object of the invention is to provide a motor vehicle power plant having a supercharger embodied therein and cooperating therewith in a manner to provide increased power and more ready response in the control and operation of the vehicle and greater efficiency in its travel and performance.

Further, the invention has for its object to provide a supercharging construction in the nature of an auxiliary internal combustion engine operable independently of but preferably under the same control for the vehicle engine. The invention further resides in the manner and method of controlling and operating the auxiliary engine for obtaining ready response from the main vehicle engine.

In the drawings:

Fig. 7 is a view of a modified embodiment.

Fig. 8 is a front elevation of the modified supercharger.

Fig. 9 is a plan view thereof with parts in section.

Fig. 10 is a fragmentary section, on a larger scale, taken substantially along the line 10—10 of Fig. 8.

Figure 1:
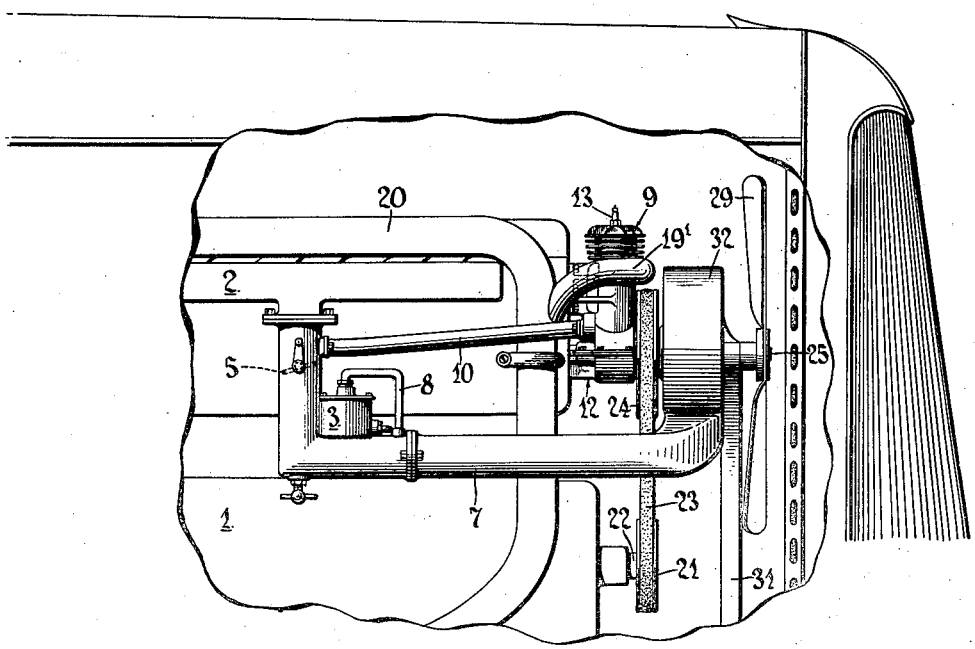
Fig. 1 is a fragmentary view of a motor vehicle equipped with a power plant constructed in accordance with the present invention.
Figure 3:
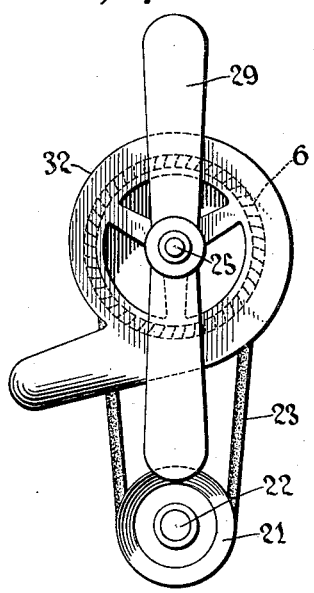
Fig. 3 is a front elevation of a portion of the supercharger.

Referring more particularly to the accompanying drawings, the numeral 1 designates the main internal combustion engine utilized for propelling the vehicle, 2 the intake manifold, 3 the carburetor having its nozzle 4 discharging into the intake manifold, 5 the throttle or butterfly valve controlling the supply of combustible mixture to the motor vehicle engine 1.

The supercharger comprises means for supplying air under pressure to the manifold 2 which according to the present invention is in the form of a compressor or blower 6 having its discharge connected by a conduit 7 to the manifold 2. A compressor of the type illustrated will not build up a pressure injurious to the power plant when the throttle is closed, but will hold the air in the conduit under a slight pressure ready to release into the intake manifold when the throttle is opened. The air discharge from the compressor is herein shown as passing over the carburetor nozzle 4 so as to induce a faster fuel discharge from the nozzle to commingle with the air under pressure. An equalizing passage 8 is provided between the float chamber 3' of the carburetor 3 and the air conduit 7.

In accordance with the illustrated embodiment, the blower or air compressor 6 is operated by an auxiliary or secondary internal combustion engine 9 which may be of the two-cycle type and is supplied with its combustible mixture through an auxiliary manifold or conduit 10 branching from the main manifold 2. The supercharger engine 9 may be mounted directly on the vehicle engine 1 or be an integral part thereof.

The auxiliary manifold 10 is provided with a control valve or throttle which may be operable simultaneously with the throttle of the vehicle engine 1. To this end the throttle 5 is utilized as a common control for both manifolds 2 and 10, the manifold 10 branching from the manifold 2 at a point between the throttle 5 and the main engine. Consequently, when the throttle 5 is opened both engines 1 and 9 will accelerate and since the auxiliary engine has merely the load of the air compressor it will accelerate much faster, relatively speaking, than the vehicle engine. This will immediately serve to supply the combustible mixture to the manifold 2 at a pressure above that normally obtaining therein in the absence of an air compressor and solely under the influence of the engine suction. The charge of combustible mixture supplied the vehicle engine will be larger and partially compressed and thereby enable an increase in the power and an immediate response to meet the demand made upon the power plant.

The usual operation of a motor vehicle engine that is not equipped with a supercharger has a very low pressure or suction induced in the intake manifold by reason of the receding pistons of the engine, and for the purposes of this description this low pressure or suction may be considered as a normal. The air compressor of the present invention will supply an increased pressure above this normal which may in some instances run less than atmospheric although it is preferable to have the pressure exceed the pressure of the outside atmosphere. For ease in description therefor the use of any phrase referring to the pressure as being delivered above atmospheric will also include a pressure above the normal low pressure in an operating engine unequipped with a supercharger, even though pressure may be under that of the outside atmosphere; having in mind the utility of a supercharger which is broadly to supply the air at a pressure and flow greater than that which the normal intake manifold suction will induce.

The auxiliary engine 9 may be provided with an independent ignition system if desired. In the present showing it is equipped with a spark intensifying coil 11 and a make-and-break generally indicated by the numeral 12 and by which the spark plug 13 will be supplied with the current to effect the required ignition at timed intervals. In accordance with the two-cycle principle the auxiliary intake manifold 10 will deliver its combustible charge through an inlet valve 14 into the crank case or chamber 15 of the auxiliary engine to be compressed upon the down stroke of the piston 16 for subsequent admission through the transfer passage 17 to the combustion chamber 18 when the downwardly moving piston uncovers said transfer passage, the previously burnt gases exhausting through the port 19 and its exhaust pipe 19' into the exhaust manifold 20 of the vehicle engine, as shown in Fig. 1.

Figure 4:
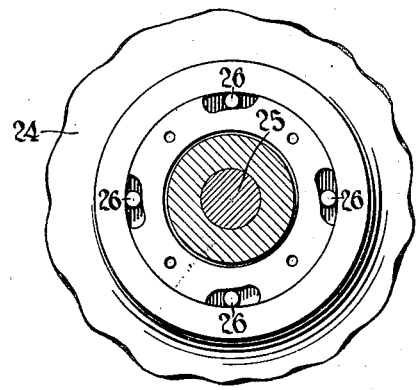
Fig. 4 is a detailed sectional view about on line 4—4 of Fig. 2 through the overrun clutch.
Figure 2:
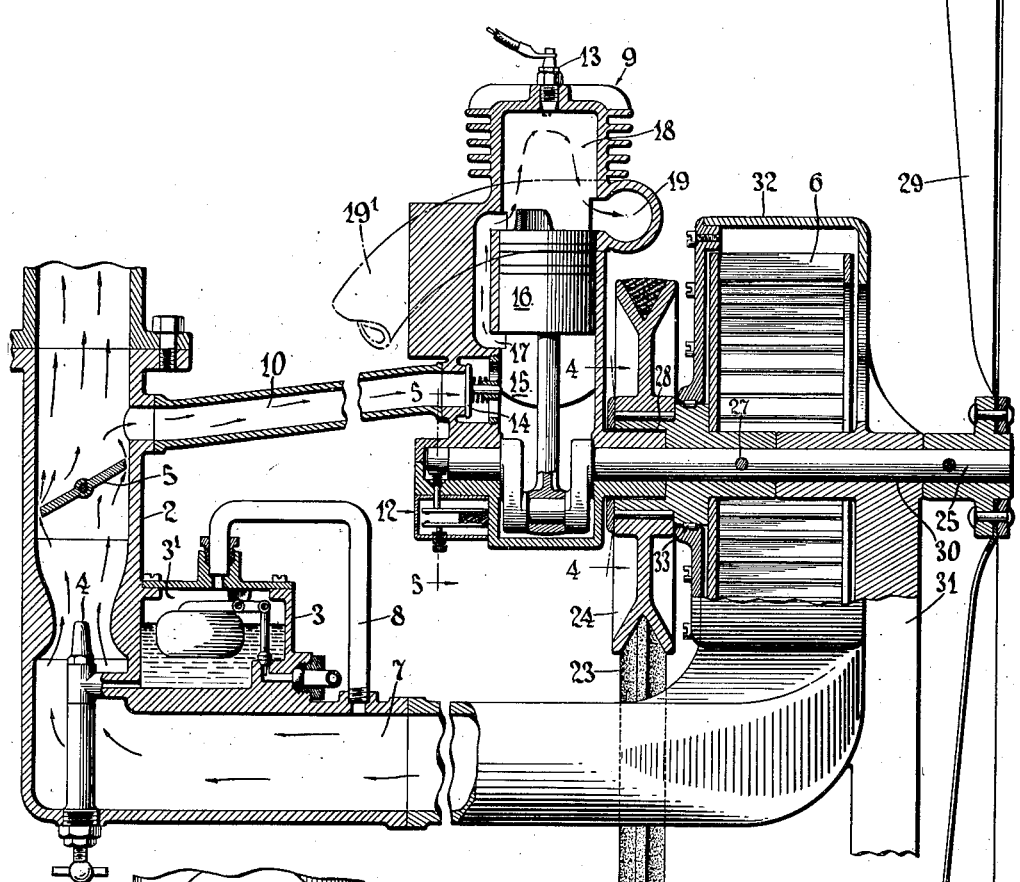
Fig. 2 is a sectional view disclosing more clearly the incorporation of the supercharger in the power plant.
Figure 5:
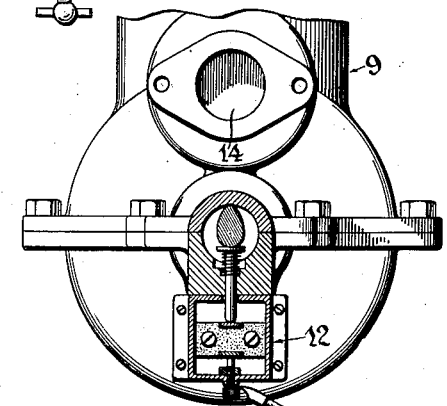
Fig. 5 is a sectional showing through the timing mechanism, as viewed about on line 5—5 of Fig. 2.
Figure 6:
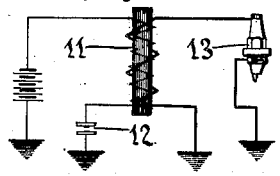
Fig. 6 is a wiring diagram of the supercharger ignition.

The auxiliary engine may be provided with an independent starting system if this is preferred although according to the present disclosure the self-starting system for the vehicle engine is relied upon. For this purpose a pulley 21 is mounted on the main engine shaft 22, which pulley may be that heretofore used to drive the cooling fan. A belt 23 transmits power from the pulley 21 to a driven pulley 24 mounted on the auxiliary engine shaft 25. This driven pulley or wheel is adapted to be clutched to the shaft 25 to drive the same for starting purposes but will automatically unclutch to permit the shaft to idle therethrough when said auxiliary engine shaft is driven at a faster speed. The form of overriding clutch used may be that shown in Fig. 4, the same comprising a plurality of clutch elements or rollers 26 serving to function when the wheel 24 is driven faster than the shaft 25 but uncoupling the wheel from the shaft when the latter is driven at a faster speed of rotation. According to the present showing the blower 6 which is splined or keyed to the shaft 25, as indicated at 27, is provided with a hub extension 28 serving to journal or support the wheel 24. The shaft 25 may also carry the engine cooling fan 29, the shaft being given additional support adjacent the fan in the bearing 30 which is braced by a strut 31. The blower housing 32 may be supported from this strut and given additional support on the hub extension 28, as at 33.

In the modification shown in Figs. 7 to 10, the auxiliary engine is offset to one side of the vehicle engine 1 and its shaft 25' has fixed thereon a pulley 34 which is belted to a compressor pulley 35 on the shaft 36 of a multi-stage compressor 37, the shaft being extended forwardly to carry also the engine cooling fan 38. Consequently the operation of the auxiliary or supercharger engine will, through the belt or transmission 39, operate the compressor 37 as well as the fan 38, and air from the compressor 37 will be delivered through the air passage 7' to the intake manifold in a manner similar to that described for the embodiment shown in Fig. 1.

To start the auxiliary engine in the form illustrated in Figs. 7 to 10, the pulley 24' may have one-way clutching engagement with the shaft 25' as by providing the hub of wheel 34 with one-way clutching elements 25 and a bearing 40 to journal the wheel 24', the latter being geared to the main engine pulley 21 by the belt 23 as in the previously described embodiment. Thus the pulley 24' is mounted with respect to the shaft 25' in the same relation as the pulley 24 and shaft 25.

From the foregoing it will be noted that the auxiliary or supercharger engine 9, while taking its charge from the common manifold 2, is not so heavily loaded as the vehicle engine and therefore will promptly accelerate when the throttle 5 is opened. This prompt response of the auxiliary engine will immediately place the charge in the intake manifold 2 under a pressure in excess to that induced by the vehicle engine so that the latter will promptly respond and deliver increased power. This will enable a quick "get-a-way" of the vehicle at the start, a rapid acceleration thereof and an increased speed of travel for the vehicle in the open stretch. The main and auxiliary engines are brought under a common control so that a touch of the throttle will set the supercharger in operation and immediately accelerate the main or vehicle engine. When the throttle is closed both engines will idle and when the throttle is opened both engines will accelerate, the more lightly loaded auxiliary engine making more ready response and because of such ready response the main engine will be promptly supplied with its combustible mixture at an abnormally high pressure so that its response will be substantially instantaneous or parallel with the response of the supercharger.

The response of the vehicle engine is also accentuated by the sudden release of the pent up pressure in the conduit 7 resulting from the idling air compressor and the closed throttle. Consequently upon the opening of the throttle this pressure will release into the intake manifold 2 concurrently with the accelerating of the auxiliary engine and thereby tend toward greater responsiveness. Therefore, the vehicle is not only supplied with additional power but is immediately supplied with the same by the supercharger which is built in and operates more as a unitary part of the vehicle power plant. The supercharger will function without placing any additional burden upon the vehicle engine, and when the latter is idling with the throttle closed the compressor will obviously merely churn the air without injury to the power plant.

What is claimed is:

1. A motor vehicle power plant comprising a vehicle propelling engine of the internal combustion type, an intake manifold therefor having a throttle valve, a carburetor, an air compressor for delivering air under pressure through the carburetor to the intake manifold to compress the combustible mixture in the latter as it is delivered to the engine, a second internal combustion engine of the two-cycle type operating the air compressor, and a conduit connecting the second engine to said manifold between the first engine and said throttle valve whereby the control of both engines will be substantially concurrent with the adjustment of the throttle valve.

2. A motor vehicle power plant comprising a vehicle propelling engine of the internal combustion type, an intake manifold therefor, a throttle for controlling the operation of the engine, a carburetor, means for increasing the pressure of the combustible mixture in the manifold to a pressure in excess to the normal engine induced low pressure of the manifold, an auxiliary internal combustion engine, a fluid connection between the auxiliary engine and the intake manifold for delivering a portion of such compressed combustible mixture to the auxiliary engine for operating the same, said fluid connection entering the manifold between the throttle and the main engine.

3. A motor vehicle power plant comprising a vehicle propelling engine of the internal combustion type, an intake passage therefor, an air compressor for delivering combustible mixture to the intake passage at a pressure in excess of the normal engine induced low pressure, an auxiliary internal combustion engine of the two-cycle type in communication with said intake passage and connected for operating the air compressor, and means permitting acceleration of the auxiliary engine independently of the vehicle engine whereby the air compressor may function to effect a ready response of the vehicle engine.

4. A motor vehicle power plant comprising, in combination with the vehicle propelling internal combustion engine having an intake manifold and a connected carburetor, means for supplying air to the carburetor under pressure for increasing the charge supply to the engine, a secondary internal combustion engine for operating said air supply means, means for starting the secondary engine from the starter system of the propelling engine, means permitting operation of the secondary engine independently of the propelling engine whereby said secondary engine may accelerate faster than said propelling engine, and a common control for controlling the supply of combustible mixture to both engines.

5. A power plant for motor vehicles having an internal combustion engine for propelling the vehicle, means for supplying a charge of combustible mixture to the engine including an air compressor, a secondary internal combustion engine independent of the propelling engine and operable to actuate the air compressor, said secondary engine being arranged in advance of the propelling engine and having its engine shaft operatively connected to the air compressor, and a fan operatively connected to said engine shaft and disposed in advance of both engines for directing a cooling breeze rearwardly over both engines.

6. The method of operating an internal combustion engine and an auxiliary internal combustion engine, the latter for driving an air compressor for supplying the first engine with a charge of combustible mixture at a pressure above atmospheric pressure, consisting in simultaneously supplying the auxiliary engine with a charge of combustible mixture at substantially the same superatmospheric pressure as that of the charge for the first engine whereby to maintain the operation and acceleration of both engines concurrent.

JOHN R. OISHEI.